UNITED STATES PATENT OFFICE.

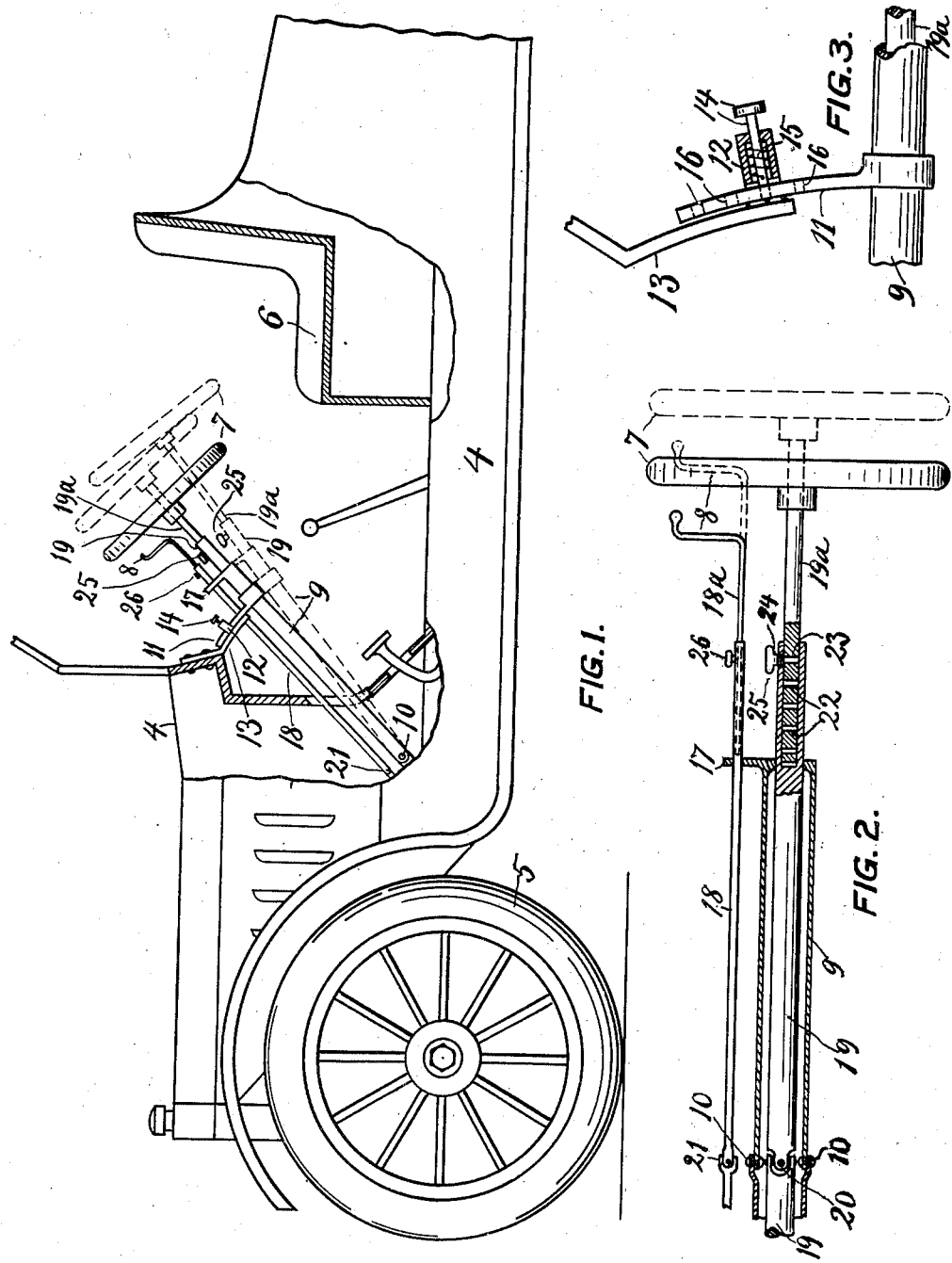

ALBERT LEE GRAY, OF FARGO, NORTH DAKOTA.

AUTOMOBILE STEERING-GEAR.

1,367,695.

Specification of Letters Patent.   Patented Feb. 8, 1921.

Application filed April 30, 1920.   Serial No. 377,994.

*To all whom it may concern:*

Be it known that I, ALBERT LEE GRAY, a citizen of the United States, residing at Fargo, in the county of Cass and State of North Dakota, have invented a new and useful Automobile Steering-Gear, of which the following is a specification.

My invention relates to steering gear for automobiles and auto trucks, and the object is to so improve the steering gear that the hand wheel and adjacent parts may readily be adjusted up and down and backward and forward to accommodate the size and taste of the operator.

In the accompanying drawing:

Figure 1 is a side elevation of a portion of an automobile equipped with my improved steering means. Fig. 2 is a partly sectional detail view of the improved steering parts only, on an enlarged scale. Fig. 3 is also an enlarged detail view of some of the parts of the invention.

Referring to the drawing by reference numerals, 4 designates the body, 5, the front wheels, 6 the driver's seat of an automobile. Forward of the seat 6 are the usual hand wheel 7 and gas or oil valve regulating handle 8.

In order to make said elements 7 and 8 adjustable to convenient reach of different drivers, I provide the usual hollow standard 9 with a joint 10 near the floor of the car. I also provide the upper part of the standard with a segmental arm 11 which is slidable in the portion 12 of a bracket 13 secured on the body of the car. In said portion 12 is a slidable pin 14 pressed forward by a spring 15 so as to readily engage either of the apertures 16 in the slidable arm 11. The standard may have the usual arm 17 as a bearing for the rod or shaft 18 which carries the handle 8.

At about the same distance from the floor of the car as the joint 10 the steering shaft 19 is provided with a universal joint 20, and the rod 18 with a universal joint 21 (see Fig. 2) which universal joints allow the shafts 19 and 18 to turn also when partly bent at said joints.

The shaft 19 is extensible by having its upper section 19ª telescoped into the lower section and provided with several apertures 22 arranged to be engaged by a pin 23, which has a portion 24 threaded in the section 19 and is provided with a thumb head 25. In like manner the upper section 18ª is secured by a screw pin 26 in the section 18 of the gas controlling valve rod.

In the operation or use of the invention the hand wheel and the handle 8 may thus be adjusted up and down and toward and away from the seat 6.

What I claim is:—

1. In an auto vehicle steering gear, a tubular standard having its lower portion provided with a joint and its upper portion provided with a segmental arm slidable in a bracket fixed on the body of the vehicle and means for holding said arm in different positions, a steering shaft rotatable in the tubular standard and provided at its upper end with a hand wheel and having a universal joint in about the transverse plane with the joint of the standard, said steering shaft composed of two telescoped sections, and means for locking the two sections together in variously extended positions, the tubular standard having also near its top a lateral bearing, a gas valve operating shaft journaled in said bearing and provided with means for taking hold in turning it, said shaft having a universal joint near the joint of the standard, it also having a slidable joint by which it may be extended and means for holding the joint in any extended position.

2. The structure specified in claim 1, said bracket on the vehicle having an aperture for the segmental arm and a spring-pressed pin arranged to engage the arm, said arm having apertures in which to receive the end of the pin.

In testimony whereof I affix my signature.

ALBERT LEE GRAY.